United States Patent [19]

Blair et al.

[11] 4,058,172
[45] Nov. 15, 1977

[54] TOOTH ARRANGEMENT IN REARWARDLY FOLDING CULTIVATORS

[75] Inventors: Calvin B. Blair, Barnard; Kenneth A. Hake, Tipton, both of Kans.

[73] Assignee: Kent Manufacturing Co., Inc., Tipton, Kans.

[21] Appl. No.: 659,017

[22] Filed: Feb. 18, 1976

[51] Int. Cl.² .......................................... A01B 65/02
[52] U.S. Cl. .................................. 172/311; 172/456; 172/707
[58] Field of Search .................. 172/311, 456, 707

[56] References Cited

U.S. PATENT DOCUMENTS

| | | | |
|---|---|---|---|
| 2,707,909 | 5/1955 | Ampe | 172/707 X |
| 3,150,722 | 9/1964 | Tromm | 172/707 |
| 3,373,822 | 3/1968 | Hornung | 172/311 |
| 3,628,613 | 12/1971 | Kaufman | 172/311 |
| 3,700,040 | 10/1972 | Sosalla et al. | 172/311 |
| 3,702,161 | 11/1972 | Zachary et al. | 172/311 |
| 3,990,521 | 11/1976 | Ankenman et al. | 172/311 |

Primary Examiner—Paul E. Shapiro
Attorney, Agent, or Firm—Fishburn, Gold & Litman

[57] ABSTRACT

A folding cultivator is disclosed wherein first and second sets of downwardly extending teeth are attached to the rearwardly folding wing of the cultivator at spaced intervals along its length. The teeth are arranged so that teeth of one set are located on each side of a tooth of the other set. In addition, the distal ends of the teeth of one set are located forwardly with respect to distal ends of the teeth of the other set. When the wing frame of the cultivator is folded and unfolded to achieve transporting and operating configurations, respectively, the teeth of a central wing section and those of outer wing sections intermesh without entangling and damaging each other.

3 Claims, 7 Drawing Figures

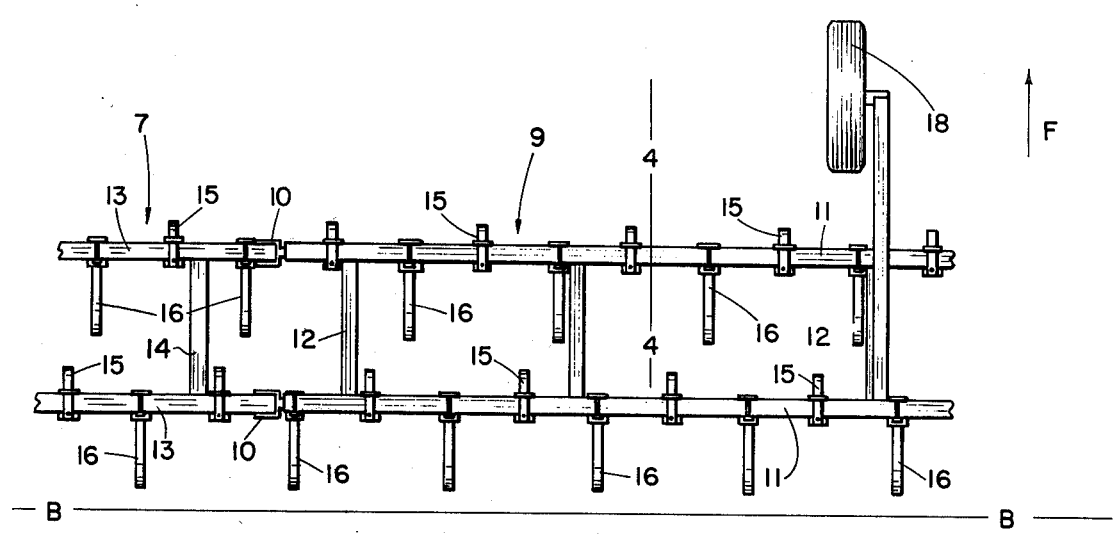
Fig. 3
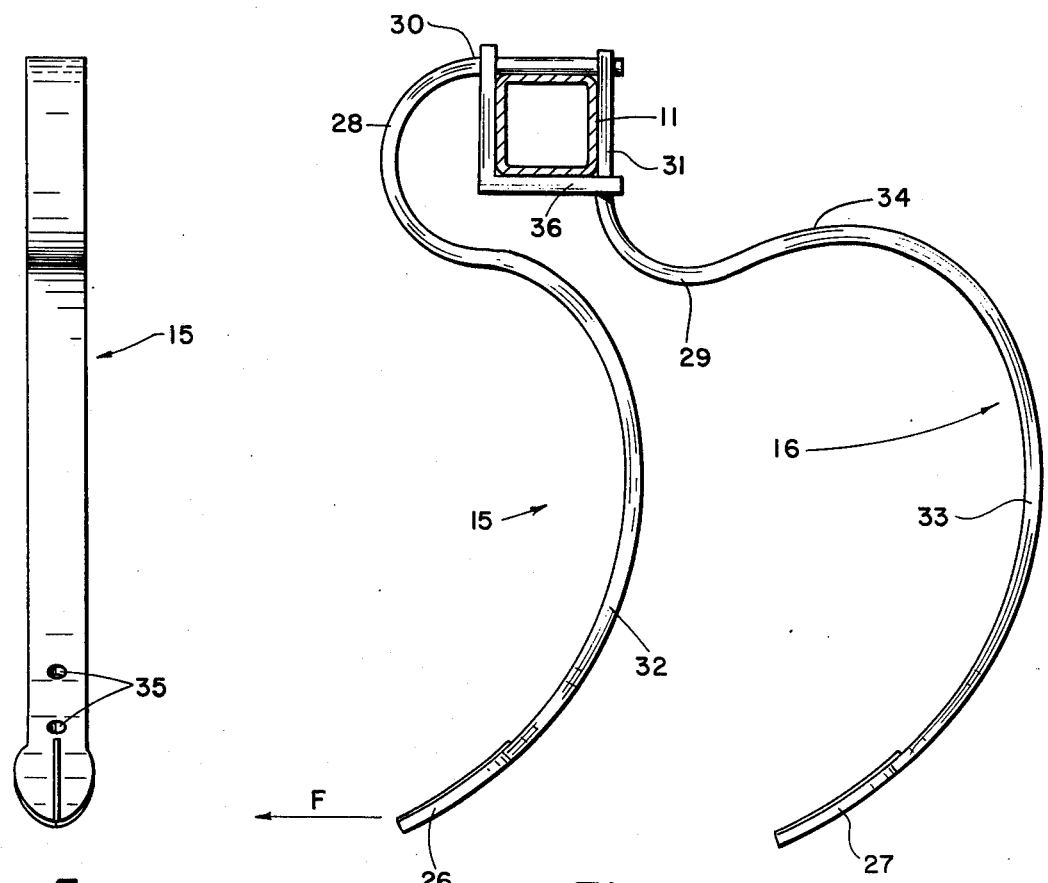
Fig. 5
Fig. 4

TOOTH ARRANGEMENT IN REARWARDLY FOLDING CULTIVATORS

BACKGROUND OF THE INVENTION

The present invention pertains to farm implements of the general type wherein earth-working tools are attached to a multisectional wing frame that can be rearwardly folded from an operating configuration to a transporting configuration. More specifically, the present invention pertains to the manner in which earth-working tools carried by the wing are shaped and arranged thereon to facilitate cultivation of the earth, yet without being a hindrance to folding of the wing frame to achieve desired configurations for operation or transport of the implement.

Along with the development of larger and more powerful farm tractors, cultivators have been developed which comprise a laterally extending, multisectional, folding wing frame having a span of up to 75 feet or even greater. The wing frames are foldable upwardly, forwardly or rearwardly to reduce the width thereof during transportation of the cultivator from one working site to another or to storage. Earth-working implements are carried on the frame of the wing and permit the tractor operator to work large swaths of soil during each pass over a field, hence reducing time and cost of a cultivating operation. The acceptance and use of cultivators having folding wing frames has continued to increase, especially for large farms, and there has thus been an ascendency of new earth-working tools and/or new arrangements of tools that are intended for use with these devices.

Of the various cultivators having folding wing frames, one of the more popular types has a rearwardly folding wing, i.e. the wing extends laterally with respect to the tractor during operation, and folds rearwardly with respect to the path traveled by the tractor to provide a transporting configuration whereby the width of the implement becomes narrow enough for passage through gates in fences and for negotiation of roadways over which it is pulled by a tractor.

Cultivators having rearwardly folding wing frames have become very popular, and one version thereof is disclosed in U.S. Pat. No. 3,700,040, but it can be determined from this patent that a problem sometimes exists in shaping and arranging the earth-working tools on the wing frame in a pattern which effects cultivation of soil as desired without hampering folding or unfolding of the wing frame to arrive, respectively, at transporting and operating configurations. As can be seen in FIGS. 1 and 7 of the aforementioned patent, the foldable outer wing sections that are pivotally attached to the central wing section can be staggered or offset rearwardly with respect to the central section so as to avoid entanglement and damage of the earth-working tools during folding and unfolding of the outer sections. This arrangement is, however, sometimes regarded as less than satisfactory because of its awkwardness and greater cost of fabrication.

One object of the present invention, therefore, is to provide an arrangement of earth-working tools on a cultivator having a rearwardly folding wing frame whereby desirable cultivation of soil is obtained, yet without creating a hindrance to folding of the wing frame to a desired configuration.

Another object is to achieve the foregoing objects while using a first and a second set of downwardly extending, curved teeth on the wing frame which condition the soil, or serve as shanks for earth working tools, wherein the distal ends of one set of teeth being located forwardly of the distal ends of the teeth of the other set, and wherein rearward deflection of all of the teeth is substantially equal during operation of the cultivator.

Still another object is to provide for an arrangement of teeth on a cultivator having a rearwardly folding wing whereby lateral spacing of the teeth can be at regular intervals without having to stagger outer wing sections with respect to a central section.

These and other objects and advantages of the new apparatus disclosed herein will become apparent from the following description and the appended claims.

SUMMARY OF THE INVENTION

The present invention is a farm implement comprising a rearwardly foldable wing frame with a first and a second set of downwardly projecting teeth attached thereto, a tooth of one set being located on each side of a tooth of the other set, and wherein the distal ends of the teeth of one set are located forwardly with respect to the distal ends of teeth of the other set. The shape and construction of the teeth can be such that rearward deflection of each is substantially equal when exposed to identical torquing conditions, and teeth adjacent the pivot joints of the wing frame can overlap each other so that they do not entangle or become damaged during folding of the wing. Accordingly, there is no necessity of staggering or offsetting outer sections of the wing frame from a central section thereof.

BRIEF DESCRIPTION OF THE DRAWINGS

FIG. 3 is an enlarged top view of portions of the central and outer wing sections of the cultivator shown in FIGS. 1 and 2.

FIG. 4 is a side view taken along line 4—4 of FIG. 3, and shows the different curvature of the two sets of teeth and the manner in which they are attached to a tooth bar of the outer section of the frame.

FIG. 5 is a front view of one of the teeth shown in FIG. 4.

DESCRIPTION OF PREFERRED AND ALTERNATIVE EMBODIMENTS

Forward, rearward, and transverse or lateral directions which will be used herein to describe orientation of various parts of the cultivator are represented by arrows F, R and S, thus representing such directions in relation to the front, rear and sides of the cultivator.

Figure 1:
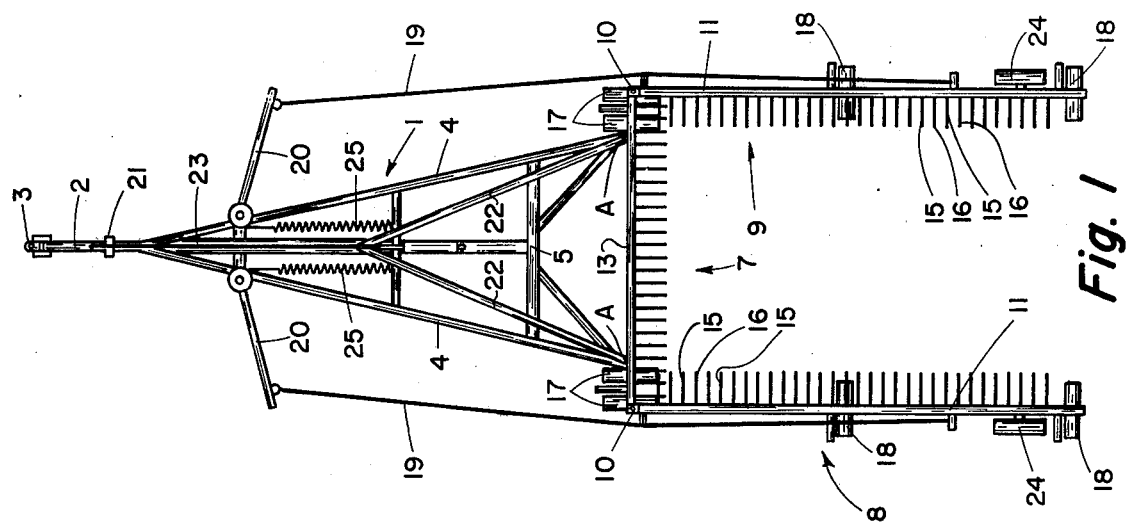
FIG. 1 is a top view of a cultivator having a rearwardly foldable wing, and showing the wing folded rearwardly to a transporting configuration. The wing is equipped with two sets of teeth in accordance with the present invention.
Figure 2:
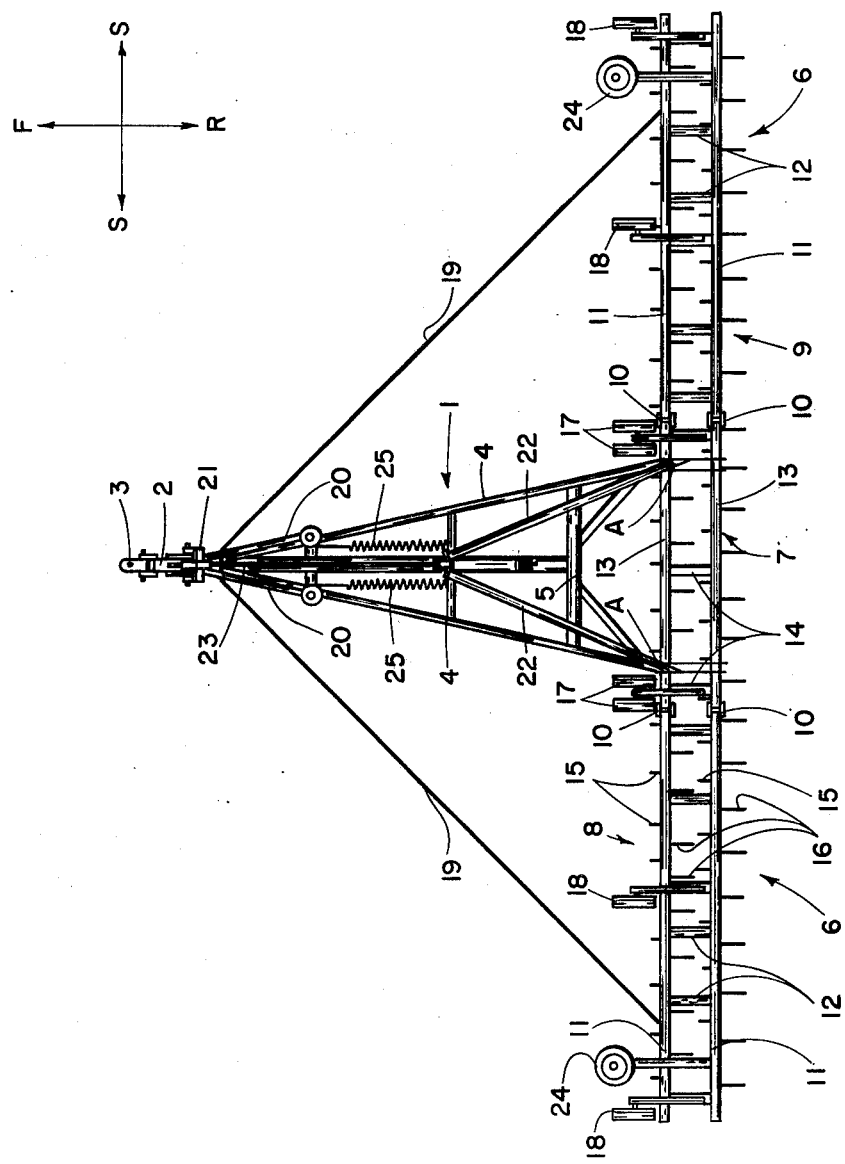
FIG. 2 is a top view of the cultivator of FIG. 1 showing the wing folded to an operating configuration.

A multiple section cultivator is shown in FIGS. 1 and 2. The main frame of the cultivator, generally represented at 1, is normally horizontally disposed and includes a tongue 2 having a towing hitch 3, two sides 4 attached to the tongue toward the front end thereof and which diverge as they extend rearwardly, and a cross-brace 5 for stabilizing the sides, and to which the rear end of the tongue 2 is attached.

The cultivator has an elongated transversally extending wing frame, generally represented at 6, which is pivotally attached transversally to the rear end of the wing frame at points A for upward and downward pivoting of the entire wing frame when extended as in FIG. 2 The wing frame has a central wing section, represented at 7, and outer wing sections, represented at 8 and 9, which are pivotally attached to the central section by means of pivot joints 10. The outer wing sections each have a pair of parallel tool bars 11 which are spaced apart and interconnected by means of cross-braces 12. Similarly, the central wing section 7 has a pair of parallel tool bars 13 which are spaced apart at the same distance as the tool bars of the outer sections and are interconnected by the cross-braces 14. As shown in the drawings, each of the tool bars 11 and 13 is provided with two sets of teeth, the teeth of one set being represented at 15 whereas the teeth of the other set are represented at 16. The arrangement, shape, orientation and action of the teeth will be further described hereafter with reference to FIGS. 3-7.

FIG. 2 represents the cultivator with the wing frame folded in an operating configuration. The cultivator rolls on wheels 17 and 18 during operation and the wing frame is stabilized against rearward deflection by means of cables 19, which are attached at the forward end of pivoted cable arms 20 on the front of the main frame, and which extend rearwardly for attachment to the outer wing sections 8 and 9.

In the transporting configuration shown in FIG. 1, the cable arms 20 are folded forwardly and inwardly as shown and are retained in that position by means of a pivotable latch 21 which engages the forward ends of the arms. When the wing frame is to be folded to a transporting configuration, the forward ends of the arms 20 are unsecured by pivoting the latch 21 forwardly while the entire wing frame is pivoted upwardly and forwardly on pivots A and A. Both the unlatching of the arms 20 and the pivoting of the entire wing frame can be accomplished by hydraulically shifting a tower 22 in a forward direction, the tower being pivotally attached at its rear end to the wing frame, and having a rigid connecting link 23 which extends forward for pivotal attachment to latch 21.

Once the arms are unlatched and the wing has been pivoted forwardly and upwardly to a vertical position, trail wheels 24, which are rigidly attached to the ends of the outer wing sections 8 and 9, have come into contact with the ground and this results in the ends of the outer sections being raised upward until the wheels 18 have left contact with the ground. The cultivator is then towed in a forward direction and the outer sections of the wings begin to pivot at joints 10 and converge inward toward each other as the wing frame rolls forward on wheels 17 and 24. At the same time, arms 20 pivot rearwardly to permit rearward movement of the cables 19 along with the outer sections of the wings. Rearward folding of the wing sections 8 and 9 and the arms 20 continues until the cultivator has stabilized in the transport configuration shown in FIG. 1. To restore the cultivator to an operating configuration, it is rolled backward and this causes the folded outer wing sections 8 and 9 to unfold outwardly while the wing frame is still in a vertical position from pivoting at points A. As the wing thus straightens, slackening of cables 19 is prevented by automatic pivoting of arms 20 forwardly through use of springs 25. When all of the wing sections are aligned transversally, the entire wing is then pivoted downward at points A by means of tower 22 and the ends of the arms 20 are automatically resecured by latch 21 when it is pivoted rearwardly by means of link 23.

Figure 6:
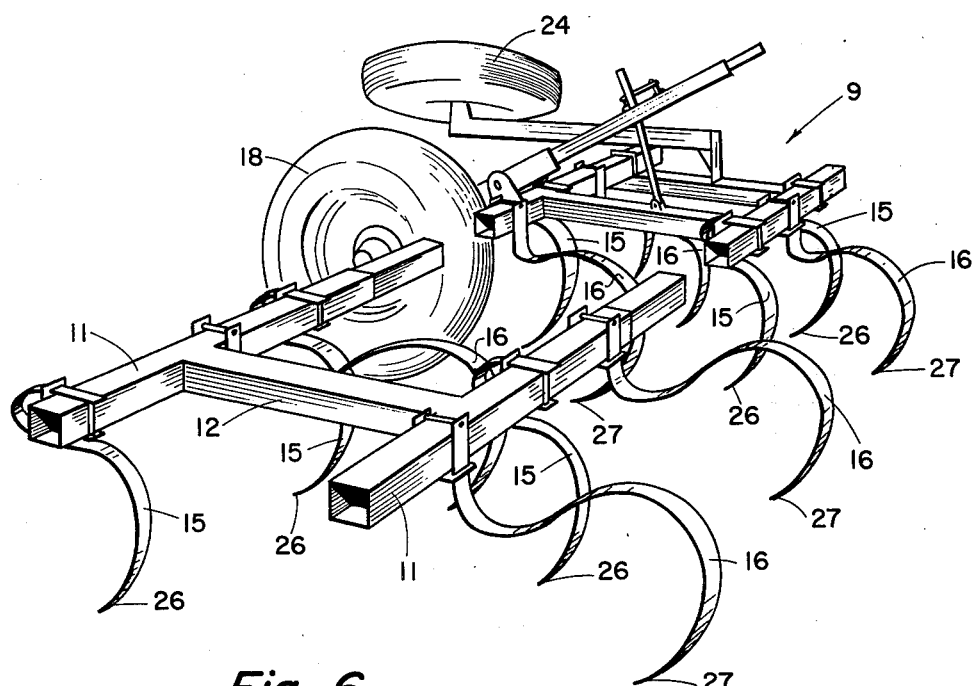
FIG. 6 is an isometric view, partially fragmented, of an outer section of the wing frame of the cultivator shown in FIGS. 1 and 2.

FIG. 6 is a fragmented view of outer wing section 9 during an operating configuration, and shows a first set of teeth 15 and a second set of teeth 16 attached to each tool bar 11 of the section. Teeth of both sets are attached in like fashion on all the tool bars of the wing sections, and hence along the entire length of the wing. The term "set" as used herein is intended to mean a plurality of teeth having the same configuration and arrangement on a wing frame, and it will be understood that in accordance with the present invention the wing frame is equipped with two sets of teeth, and one set will have a configuration different from the other set and/or will be arranged differently on the wing frame.

In FIG. 6, each of the teeth 15 of a first set is located between two teeth 16 of a second set, the teeth 16 being on each side of the teeth 15, and the distal ends or tips 26 of the teeth of the first set are located forwardly of the distal ends or tips 27 of the teeth of the second set. In addition, the teeth all extend downwardly from the wing section and, as shown in FIG. 4 the teeth of each of the sets can extend downwardly therefrom for substantially the same distance. Advantageously, the teeth can be spaced apart from each other laterally at selected regular intervals, and can slope downwardly and forwardly as shown in FIGS. 3 and 6. Also as shown therein, the teeth can be elongated, resilient metal bars which are curved with respect to the length thereof, and the straight lengths of the bars in each set can be substantially the same. ("Substantially the same" with respect to the dimension is intended to mean that a measurement of a dimension is within 10% of another measurement of the dimension, and preferably less, whereas "straight lenght" is intended to mean the overall length that the bar would measure in the absence of any significant bends or curves.) There is also an advantage to the teeth of both sets being made of the same metal and having substantially the same width and thickness since substantially equal rearward deflection of each of the teeth when subjected to the same torquing conditions is contributory to uniform tillage of the soil and clearing of trash from the field without excessive hang of the trash on the teeth.

Spring teeth of two preferred sets for use in combination with each other are shown in FIGS. 3, 4 and 5. The teeth of both sets are made from steel bars which have the same width, depth, length dimensions. In addition, the teeth of both sets have a very similar curvature, an acute-angled distal end 26 and 27, a convoluted connector section 28 and 29 depending from the proximal end 30 and 31, and an arcuate working section 32 or 33 which extends from distal end 26 and 27 of the connector section 28 and 29. It should be noted, however, that the tooth 16 includes a generally horizontal transition section 34 between the convoluted connector section 29 and the working section 33. Such a transition section is absent in tooth 15, and it should further be noted that the proximal end 30 of tooth 15 is horizontal whereas the proximal end of tooth 16 is vertical.

When arranged on a tool bar 11 as shown in FIGS. 3-7, a tooth 16 of one set is located on each side of a tooth 15 of another set, and the distal ends 26 of the teeth 15 of one set are located forwardly of the distal ends of the teeth 16 of the other set. Thus arranged, rearward deflection of teeth 15 and 16 is equal under identical torquing conditions since the metal bars from which they are made have the same composition and dimensions. Significantly, when the teeth are mounted on the sections of a rearwardly folding wing frame as shown in the drawings, entanglement and damaging of the teeth during folding of the wing can be avoided without staggering the outer sections with respect to the central section, and this feature of the invention will be further described with reference to FIGS. 6 and 7.

Where preferred, shovels or similar soil conditioning tools can be attached to the teeth by use of fastening means, e.g. bolts, which pass through openings 35 in the teeth. It will therefore be understood that use of teeth as described herein is with reference to resilient or springy teeth which engage soil for the conditioning thereof, or to shanks which can be somewhat less resilient and which serve as mounts for pointed shovels, hoes, and the like.

Alternatively to the tooth construction and arrangement as previously described, at least one set of teeth can extend downwardly without sloping forwardly, or can slope rearwardly, or else the distal ends on at least one set of the teeth need not project forwardly, but can project either straight downwardly or rearwardly.

Where preferred, the distance to which the teeth of one set extend downwardly can be different from the downward extension of the other set, and the straight length and resiliency of the teeth of one set can be different from that of the other, but equal dimensions and downward extension are preferred for obtaining equal rearward deflection, as previously described.

Although a variety of cultivators having rearwardly folding wing frames can be adapted for practice of the present invention, a preferred form will comprise a main frame to which the wing frame is attached, and will have the wing frame extending leterally from the main frame and rearwardly foldable from an operating configuration to transporting configuration. It is also preferable that distal ends of at least some of the teeth project forwardly when the wing frame is in an operating configuration, and downwardly when the wing frame is in a transporting configuration. The wing frame can comprise at least one laterally extending tool bar, preferable several arranged in accordance with FIGS. 1, 2 and 7, and teeth of both sets can be attached to the tool bar at laterally spaced intervals along its length. Preferably in such a case, the distal ends of the teeth of both of the sets can be arranged to project forwardly, as shown in the drawings, when the wing frame is in an operating configuration.

In a preferred and advantageous embodiment of the invention, the cultivator is constructed in accordance with the drawings whereby wing frame 6 attached to the main frame 1 of the cultivator comprises a central section 7 and outer sections 8 and 9 attached at each end of the central section 7, with pivot joints 10 for forward and rearward folding of the wing frame, each of the sections having teeth 15 and 16 of two sets attached thereto and spaced apart from each other laterally, and wherein the distal ends 26 and 27 of teeth of both sets are aligned with each other at the same distance with respect to a laterally extending straight line, such as B-B in FIG. 3, which is a common transversal reference line for all of said wing sections.

Figure 7:
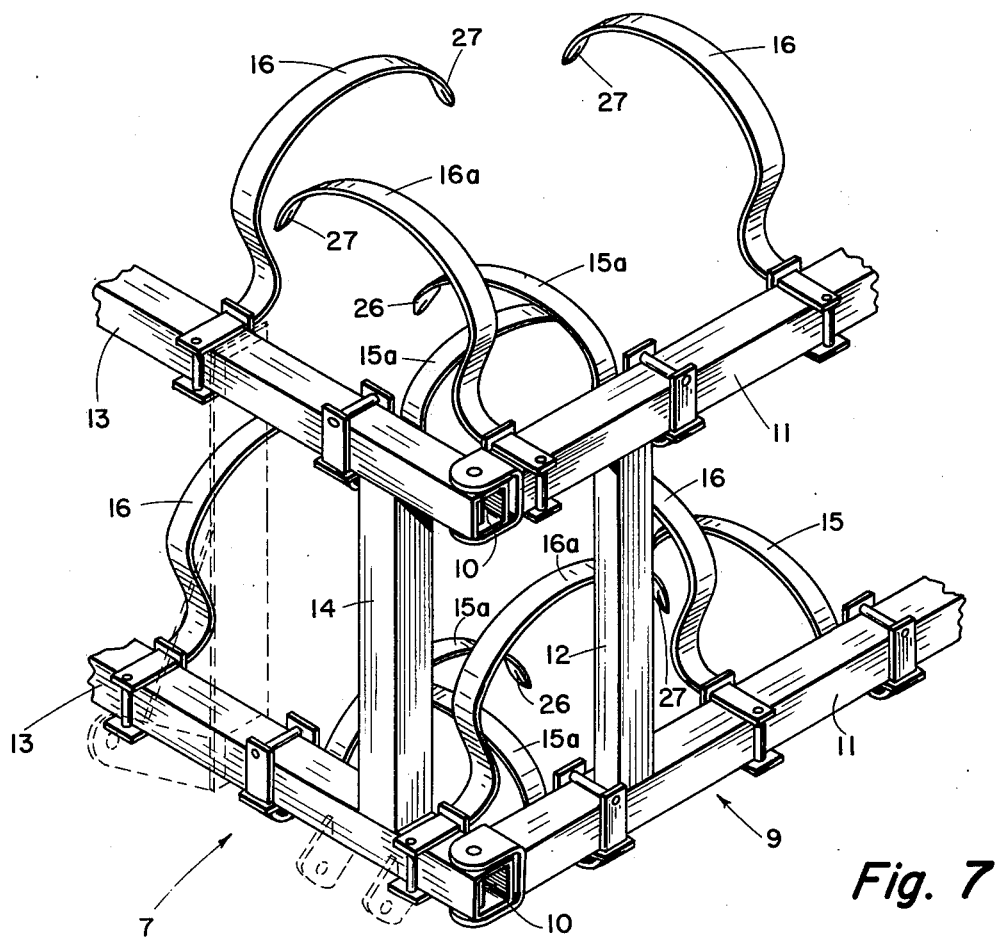
FIG. 7 is an isometric view, partially fragmented, of the central section and an outer section of the wing frame of the cultivator shown in FIGS. 1 and 2, and illustrates the pivotal connection of the two sections and the intermeshing of the teeth adjacent each side of the pivoted connection when the wing frame is folded as in FIG. 1.

Referring to FIG. 7, it can be seen that for avoiding entanglement and damaging of teeth during folding and unfolding of the wing frame, it is advantageous that a tooth of one of the sets on the central section be located adjacent one side of each of the pivot joints 10 while locating a tooth of the other set on the other side of each of the joints. Accordingly, a tooth of one of said sets can overlap a tooth of the other set, without entanglement, when the wing frame is folded from a transport configuration to an operating configuration, or vice versa. This is made possible by the particular curvature of the teeth and also the front-to-rear offsetting arrangement of the pivot joints.

When using two sets of teeth in combination with a cultivator having a rearwardly folding wing frame with a central section and pivoted outer sections, front and rear groups of teeth of two sets can be arranged in laterally extending rows, and can be mounted on front and rear tool bars as shown in the drawings. Accordingly, some of the teeth of both sets can be attached to the wing frame forwardly of the rest of the teeth of both sets. Preferably, the forwardly attached teeth of one of said sets can be offset laterally with respect to the rest of the teeth of the set that is located rearwardly. More preferably, each tooth of both of said sets can be laterally offset from all the other teeth attached to the wing frame. Additionally, and to particular advantage in folding the wing frame from one configuration to another, the distal ends of the teeth of one of the sets is located forwardly of the one or more pivot joints between the central and outer wing sections, and the distal ends of the teeth of the other set can be located rearwardly of the one or more pivot joints.

Each of the arrangements of teeth on the wing frame which has previously been referred to as advantageous and preferable is illustrated in the drawings, and it will be appreciated by those skilled in the art that other arrangements can be used which nonetheless fall within the scope of the present invention. It is not essential, for instance, that front and rear groups of both sets of teeth be employed, since only one or more than two groups or rows of each set can also be used. Furthermore, when two or more groups or rows of two sets of teeth are used, it is not essential that the forwardly attached teeth of one set be laterally offset with respect to one or more teeth of the same set or the other set. It is not essential, either, to employ tool bars as shown in the drawings. Equivalent types of tool bars can be used or need not be used at all in the event the wing sections are provided with alternative means of mounting the teeth thereto.

As previously indicated, it is preferable that the metal bars from which the teeth 15 and 16 are made have the same width, thickness and straight length dimensions. Teeth 15 have less depth of curvature than teeth 16 through absence of a transition section 34 between the connector section 29 and the working section 33. It should be pointed out that the convoluted connecting sections 28 and 29 of both teeth are important in achieving a desired flexing action during operation of the cultivator, and if the desired equal straight length of both teeth is to be retained along with an ofset and an equal downward projection of both teeth as in FIG. 4, there is considerable advantage in using a generally vertical convoluted connector section 28 on the teeth 15 as opposed to a generally horizontal convoluted connector section 29 as is used with the teeth 16. Accordingly, when using a flat-sided tool bar as shown at 11 and 13 in the drawings, the horizontal proximal end 30 of the teeth 15 can be rested on top of the tool bar, whereas the vertical proximal end 31 of the teeth 16 can be rested against a vertical side of the bar. The teeth can be secured to the tool bar by means of a bracket 36 whereby the convoluted connector sections are out of contact with the bar, hence leaving the teeth unhindered to flex as desired.

A cultivator having an improved arrangement of teeth in combination with a rearwardly folding wing frame has now been disclosed and described in detail, and although the improvement has been described with reference to particular apparatus, apparatus arrangements, cultivators, wing frames, tooth configuration and dimensions, and the like, it will nonetheless be understood that even other embodiments will become apparent which are within the spirit and scope of the invention defined in the following claims.

What is claimed and desired to secure by Letters Patent is:

1. A cultivating implement comprising:
   a. a main frame;
   b. a rearwardly foldable wing frame attached to and extending laterally in respect to said main frame, said wing frame being rearwardly foldable from an operating configuration to a transporting configuration, said wing frame having a central wing section and outer wing sections on each side of said central wing section and a pivot joint between each of said outer wing sections and said central wing section, said central wing section and said outer wing sections each having a forward tool bar and a rearward tool bar;
   c. a first and a second set of downwardly extending teeth on said forward tool bar and said rearward tool bar of each of said central wing section and said outer wing sections, the teeth of each of said sets having a convoluted connector section toward a proximal end thereof and an acutely angled distal end depending from an arcuate working section, the teeth of one of said sets of teeth having a substantially horizontal transition section between said arcuate working section and said connector section, the teeth of both of said sets having substantially the same straight length and equal deflection under load;
   d. a tooth of said first set being located on each side of a tooth of said second set and spaced apart laterally from each other, said teeth of said first set having distal ends located forwardly of the distal ends of said teeth of said second set, said teeth distal ends of said first and second set projecting forwardly when said wing frame is in an operating configuration and projecting downwardly when said wing frame is in a transporting configuration, the distal ends of both sets of teeth being aligned with respect to a laterally extending line common to all of said wing sections, one of said first and second sets of teeth on each of said forward tool bar and said rearward tool bar of all of said wing sections being attached forwardly of the other of said first and second sets of teeth;
   e. a tooth of the first of said sets on the central wing section being located adjacent to one side of each of said pivot joints and a tooth of the second of said sets being located on the other side of each of said pivot joints whereby a tooth of one of said sets overlaps a tooth of the other of said sets without entanglement when said wing frame is folded from said operating configuration to said transport configuration.

2. A cultivating implement as set forth in claim 1 wherein:
   a. the distal end of each of the teeth of said first set of teeth on each of said respective tool bars is located forwardly of said pivot joint; and
   b. the distal end of each of the teeth of said second set of teeth on each of said respective tool bars is located rearwardly of said pivot joint.

3. A cultivating implement as set forth in claim 1 wherein:
   a. the teeth of said first set of teeth each have the proximal end thereof positioned horizontal and in engagement with a top of the respective tool bars; and
   b. the teeth of said second set of teeth each have the proximal end thereof positioned vertical and in engagement with a side of the respective tool bars.

* * * * *